United States Patent [19]

Horner et al.

[11] 3,786,458
[45] Jan. 15, 1974

[54] NON-CONTACTING ANGULAR POSITION DETECTOR

[75] Inventors: Joseph L. Horner, Belmont; Gordon R. Plank, Medford, both of Mass.

[73] Assignee: The United States of America as represented by the Secretary of the Department of Transportation, Washington, D.C.

[22] Filed: Mar. 1, 1972

[21] Appl. No.: 230,702

[52] U.S. Cl............... 340/196, 128/2.1 A, 340/282
[51] Int. Cl............................................. G08c 19/04
[58] Field of Search............................ 340/196, 195

[56] References Cited
UNITED STATES PATENTS 1,798,592  3/1931  Davis................................ 340/196
3,355,728  11/1967  Smith................................ 340/196
3,498,403  3/1970  Kohls................................ 340/196
3,656,132  4/1972  Brumbelow....................... 340/195

Primary Examiner—Thomas B. Habecker
Attorney—Herbert E. Farmer

[57] ABSTRACT

The angle between a small radio frequency coil and a spatially uniform magnetic field is measured and a signal commensurate with the measured angle is employed in a computation of angular position. The apparatus employed in the angle measurement is characterized by a DC frequency response whereby an output signal is produced in the absence of motion between the coil and field.

1 Claim, 3 Drawing Figures

PATENTED JAN 15 1974　　　　　　　　　　3,786,458

NON-CONTACTING ANGULAR POSITION DETECTOR

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

1. Field of the Invention

The present invention relates to the measurement of the angular position of a body relative to a preselected axis. More specifically, the present invention is directed to an angular position detecting system which provides electrical signals proportional to the instantaneous angular position of an object of interest with respect to an axis. Accordingly, the general objects of the present invention are to provide novel and improved methods and apparatus of such character.

2. Description of the Prior Art

While not limited thereto in its utility, the technique and apparatus of the present invention are particularly well suited for use in the testing of safety devices such as automotive restraint systems. In the testing of such restraint systems; which include safety belts, harnesses, air bags, and the like; performance and effectiveness can be measured only by providing a record of the instantaneous position of bodies which are subjected to rapid motion. Thus, again by way of example, the effectiveness of an automotive safety restraint device can be determined only if the angular position of the head and torso of a test subject; for example an animal, anthropometric dummy or live human; can be continuously observed or measured.

It is to be recognized that the requirements placed on motion sensors for use in testing automotive restraint systems are particularly severe. In such testing a crash event is either simultated on a deceleration sled or produced by directing an actual test vehicle against a stationary or moving barricade. The sensors themselves must thus be crash-worthy and reliable as well as being capable of being operated by non-professional personnel and being easily moved from subject to subject or site to site. Perhaps more significantly, the mass of an occupant motion sensor must be sufficiently small so that it does not have a significant effect on the motion which it measures. In this regard, the most sensitive case is head motion since the head is lighter than the torso and undergoes more violent motion. The sensors must also be small enough so that they will not interfere with the restraint system under test or with human subjects and, of course, the sensors must not present any hazard to the human subject's safety. Further, acceptable occupant motion sensors must have a wide electrical bandwidth to faithfully record the extremely rapid motions produced by a crash or sled deceleration.

While a number of techniques have been proposed, there is presently only one method capable of meeting the above briefly stated rigorous requirements. This present technique encompasses the use of a high speed photographic camera. There are, however, a number of serious disadvantages incident to use of a photographic record as a means for obtaining accurate quantitative data. First, there are inherent optical distortions introduced by the shutter mechanism of even the best available high speed cameras. Secondly, the results of a photographically recorded test are not immediately available but must await development of the film and subsequent film analysis. Film analysis, as is well known, is an extremely tedious and time consuming process which not only requires complicated and expensive equipment but also necessitates the examination of each film frame by a human operator. Each step in photographic deceleration data recordation and particularly visual measurements performed on the film by a human operator, introduce error; the several errors adding statistically to produce a large overall error. In addition, photography can not be successfully employed when testing devices such as air bags which typically envelop the subject, since crucial members such as the head/neck are rendered temporarily invisible.

Continuing with a discussion of the problems incident to the testing of automotive restraint systems, it is now believed that rotational, as opposed to linear, motions of the head/torso system are primarily responsible for injuries to this region of the body in a rapid deceleration (crash) situation. Rotational motion is difficult, if not impossible, to measure with either high speed cameras or presently available linear accelerometer type devices. With particular respect to the use of accelerometers, to convert linear acceleration to rotational acceleration it is necessary that a center of rotation be defined. In a mechanical system as complicated as the human head/neck/torso the center of rotation is not well-defined and changes with time. For the reasons noted above, high speed film does not yield accurate quantitative data due to the numerous possibilities of error.

SUMMARY OF THE INVENTION

The present invention overcomes the above briefly discussed and other deficiencies and disadvantages of the prior art by providing a novel and improved technique for measuring motion, for example occupant motion within a vehicle during an abrupt deceleration, and an angular position detection apparatus for use in this novel technique. In accordance with the invention a periodically varying magnetic field generator including a single coil transmitting antenna is mounted remotely from a test subject. A motion sensor comprising a pick-up coil is mounted on the body member or portion of the test subject which is of interest. The pick-up coil of the motion sensor is small enough to be placed, for example, in or on a bite bar in a human test subject's mouth and is connected in a resonant circuit. The resonant circuit is coupled to a receiver which amplifies and detects the signal developed therein whereby a time-varying electrical signal is provided. The time-varying direct current signal may be correlated to the angular orientation of the member carrying the pick-up coil. The receiver has a low impedance output thus permitting the use of a long umbilical cable between recording instrumentation, which is stationary, and the receiver which will typically move with a vehicle carrying the test subject. The use of a low impedance cable is also necessary to prevent extraneous noise pick-up and phase shift distortion caused by the capacitance of the cable. For situations where a long umbilical cable is impractical, the output of the motion sensor receiver can be telemetered back to the data recording system.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which.

DESCRIPTION OF THE PREFERRED EMBODIMENT

Figure 1:
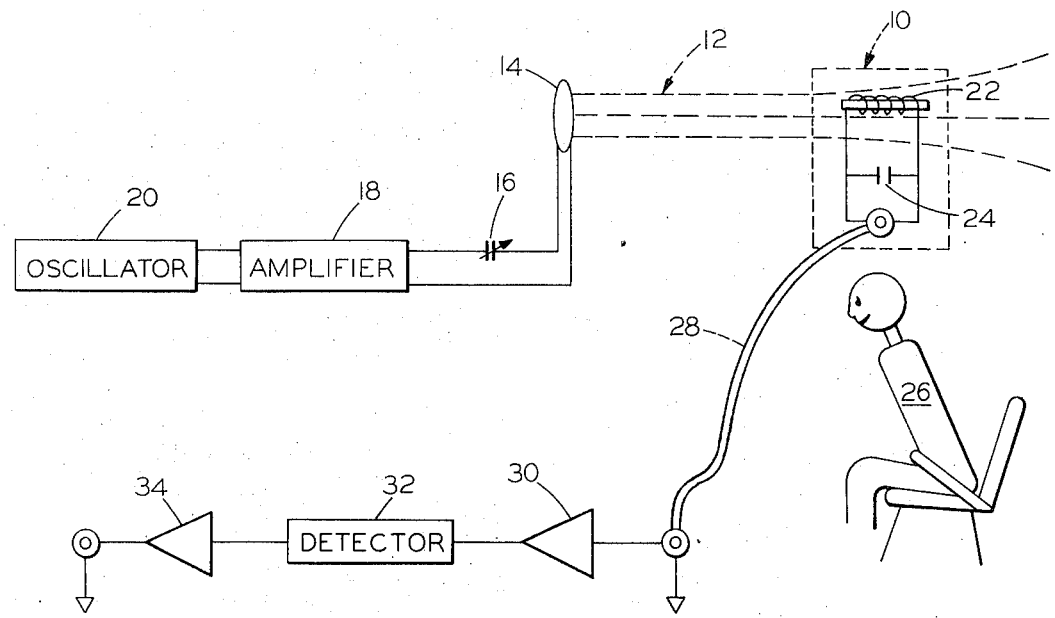
FIG. 1 is a block diagram of a preferred embodiment of the present invention.

With reference now to FIG. 1, an angular position detection system in accordance with a preferred embodiment of the present invention measures the angle between a sensor or pick-up device, indicated generally at 10, and a spatially uniform time varying magnetic field which is indicated generally at 12. The field 12 is transmitted from a single coil 14 whose size is small compared to its distance from sensor 10. The use of a single coil with conveniently small radius has been found to yield little angular deviation of the magnetic field at a reasonable working distance from the transmitter. In accordance with the invention the field angle stays within 5° of the axial direction for up to one meter off the axis at a distance of 20 meters from the transmitter.

The transmitting coil 14 is connected with a tuning capacitor 16 in a series resonant circuit. A series resonant circuit is employed in the interest of obtaining maximum current in coil 14 and hence maximum field strength. The series resonant circuit defined by capacitor 16 and coil 14 is driven by an amplifier 18 which amplifies the output signal from an oscillator 20. The output of oscillator 20 is typically selected to be of sinusoidal waveform and in the neighborhood of 50kHz. The transmitted frequency is selected as a compromise between conflicting requirements. To minimize distortion of the field 12 by metallic members; such as components of the test vehicle, rails, etc.; the frequency should be kept low since such metallic members act as conductors and can distort the field. As is well known, at lower frequencies the wave length of the field becomes longer and the conductors become less efficient. Conversely, a higher frequency permits use of a wider bandwidth and improves the efficiency and accuracy of the sensor 10.

Sensor 10 comprises a pick-up coil 22 and capacitor 24 which defines a parallel resonant circuit. Coil 22 will typically be an unshielded ferrite core RF choke coil while parallel connected capacitor 24 will typically be a silver mica capacitor. Pick-up coil 22 and capacitor 24 may be cast firmly in place in a small cube which is less than one-half an inch long. This cast unit; i.e., sensor 10; may thereafter be incorporated in a bite bar which will be held in the mount of the subject 26. The design of a sensor unit of sufficiently small size to permit its incorporation in a bite bar is a highly desirable feature of the invention in terms of accuracy and test subject safety.

In accordance with the example given wherein the transmitter coil 14 operates at a frequency of 50kHz, the output of sensor 10 will be a 50kHz carrier signal which is amplitude modulated by a signal proportional to the angular motion of the pick-up coil 22. When the inductance of coil 20 is 2,200$\mu$h and the value of capacitor 24 is 4,300pf, the peak frequency response of sensor 10 is 51.7kHz. The 1dB bandwidth is 1kHz, while the 3dB bandwidth is 3kHz. The bandwidth of the sensor may be increased by adding resistance to the parallel resonant circuit.

Figure 2:
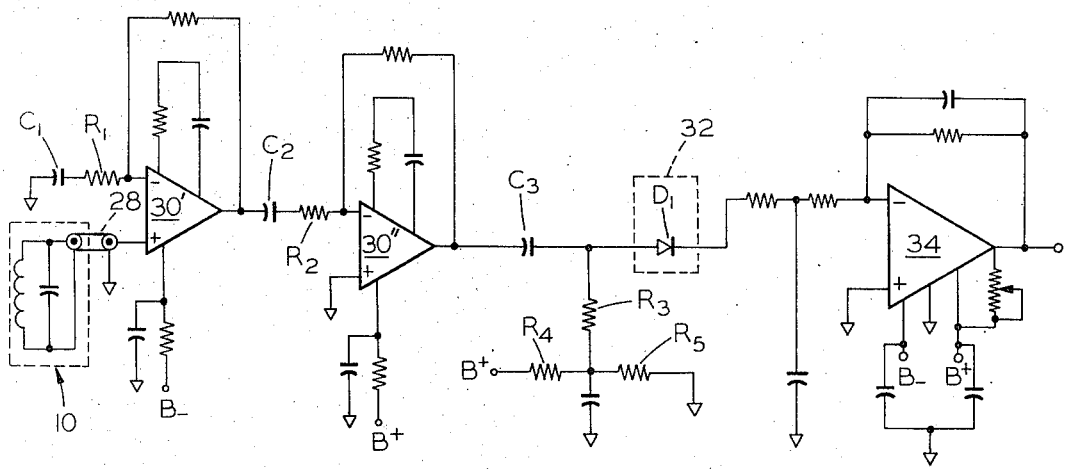
FIG. 2 is an electrical schematic diagram of the portion of the embodiment of FIG. 1.

The signal generated in sensor 10 is delivered to an onboard receiver via a cable 28. The receiver, which will typically be a solid state circuit for example as shown in FIG. 2, will comprise an amplifier 30, a detector 32 and an output DC amplifier 34. The receiver amplifies and detects the signal delivered thereto from sensor 10 and provides a DC or time-varying electrical signal which may be correlated to the angular orientation of the body member of subject 26 carrying the sensor. The receiver will typically be mounted upon the vehicle on which the subject is travelling and thus it is necessary that the receiver have a low impedance output capable of driving the long umbilical cable which connects the vehicle to suitable recording instrumentation. A low impedance output is necessary to prevent entraneous noise pick-up and phase shift distortion caused by the capacitance of the umbilical cable. The receiver will also have a very high input impedance, since the sensor has high impedance, and high gain. In one reduction to practice of the invention, with the sensor 10 positioned 30 feet from a six inch diameter transmitting coil 14, the maximum peak-to-peak voltage derived at the sensor was 0.5mv. Thus, in order to have a 5v peak-to-peak output, the receiver must have a gain of 10,000 (plus 80dB.).

Referring now to FIG. 2, a solid state receiver suitable for use with the present invention is shown schematically. The input stage of the receiver; i.e., amplifier 30 of FIG. 1; employs two identical operational amplifiers 30' and 30'' in a preferred embodiment. The first or input stage 30' employs one of the identical operational amplifiers in a non-inverting mode. Stage 30', in one reduction to practice of the invention, has a gain of 220 and uses a series RC circuit, comprising capacitor C1 and resistor R1, at its negative input to limit low-frequency response. The output of amplifier 30' is capacitively coupled to the input of second stage identical amplifier 30''. Amplifier 30'' is employed in an inverting mode. Amplifier 30'' will typically have a gain of approximately 50 and will employ a series RC circuit, defined by capacitor C2 and resistor R2, at its negative input in the interest of limiting low-frequency response. In both of amplifier stages 30' and 30'' high frequency response is limited by the internal characteristics of the operational amplifiers. The peak response of the stages 30' and 30'' is designed to match that of the sensor. Capacitive coupling is used between stages 30' and 30'', and between second stage 30'' and the detector, in the interest of eliminating the need to use trimming potentiometers to adjust for DC offsets. In one reduction to practice of the invention amplifiers 30' and 30'' comprised a Fairchild 739 integrated circuit chosen for use because of its high input impedance, a high gain-bandwidth product and low noise.

Since the receiver of FIG. 2 employs capacitive coupling between stages, a simple diode detector may not be employed because a coupling capacitor in series with a diode acts as a clamping circuit and thus would prevent the passage of the output signal from amplifier 30'' to output amplifier 34. Accordingly, a resistance network is connected between coupling capacitor C3 and the detector diode D1 to provide the coupling capacitor with a discharge path to ground. The resistance network includes resistor R3 and a voltage divider comprised of resistors R4 and R5. The voltage divider develops a small forward bias for diode D1 so that the diode can pass signals of small magnitude. The detector circuit employing diode D1 has a bandwidth of approximately 1kHz and thus meets the system bandwidth requirements.

Output stage 34 utilizes an operational amplifier, in an inverting mode, with unity gain. Amplifier 34 reinverts the detected signal and gives the receiver low output impedance so that it can be coupled to a recorder by a long cable. In one embodiment of the invention a Philbrick Model 1021 operational amplifier was employed for output amplifier 34.

Figure 3:
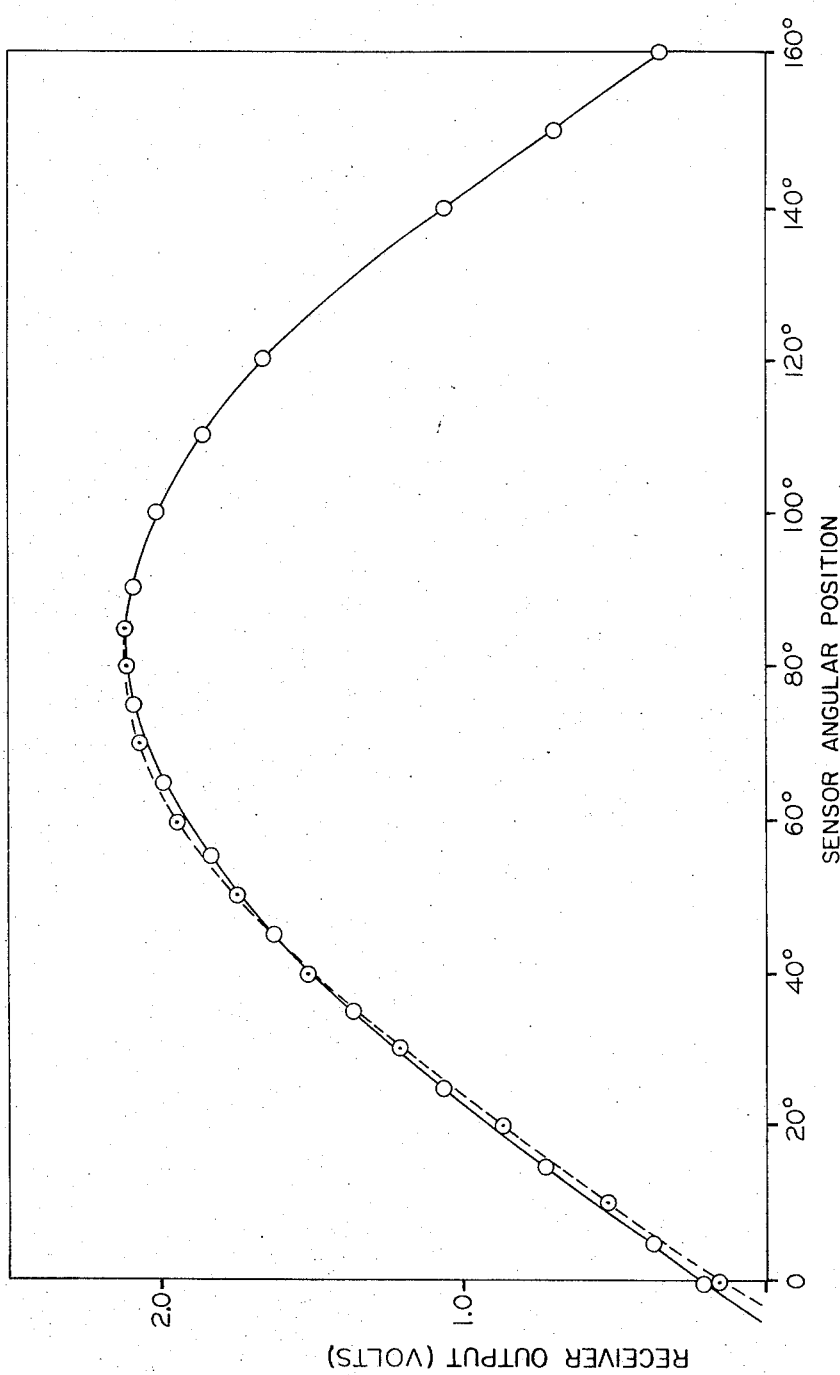
FIG. 3 is a graphical representation depicting performance of the preferred embodiment of FIG. 1.

FIG. 3 is a plot of receiver output voltage vs sensor angular position; the graph having been made with the sensor unit 10 positioned 25 feet from the transmitter coil 14. It is believed to be particularly significant that the output voltage provided by he disclosed embodiment of the present invention closely approximates a sine curve. As previously noted, the output signal from the receiver, as represented by FIG. 3, will be delivered to a recording device. The recorded signal produced by the unique position measuring apparatus of the present invention must, of course, be additionally processed and such additional processing may be accomplished through the use of digital filtering techniques since the output of the apparatus is a function of time. Thus, by way of example, the recorded signals may be processed by the use of the technique known as fast Fourier transform as described in the text "Digital Processing of Signals" by B. Gold and C. M. Rader, published by McGraw-Hill Publishing Company in 1969. It is also to be noted that the output of the motion sensor of the present invention will contain useful information with respect to acceleration and velocity of the test subject. Through proper computer programming this additional information may also be readily provided to the investigator.

While a preferred embodiment has been shown and described, various modifications and substitutions may be made thereto without departing from the spirit and scope of the present invention. Accordingly, it is to be understood that the present invention has been described by way of illustration and not limitation.

What is claimed is:

1. A position transducer system comprising:

generating coil means for generating a reference magnetic field, said reference field having an axis;

magnetic field responsive means comprising pickup coil means having a core of magnetic material and capacitor means connected in parallel with said coil means to define a parallel resonant circuit, said field responsive means positioned remotely from said generating coil means to minimize the response due to any linear motions between said generating coil means and said field responsive means, said field responsive means providing an electrical output signal proportional to the sine of the angle between said field responsive means and said reference field axis;

receiving means connected to said field responsive means comprising input amplifier means having a high input impedance, a demodulator and output amplifier means having a low output impedance, said receiving means providing an electrical signal indicative of the angular orientation of said field responsive means.

* * * * *